US010793116B2

(12) United States Patent
Bonne et al.

(10) Patent No.: US 10,793,116 B2
(45) Date of Patent: Oct. 6, 2020

(54) WINDSHIELD CLEANING ASSEMBLY (71) Applicants: Adrienne Sonja Bonne, Harrison, TN (US); Valerie Lynn Bonne, Harrison, TN (US)

(72) Inventors: Adrienne Sonja Bonne, Harrison, TN (US); Valerie Lynn Bonne, Harrison, TN (US)

( * ) Notice: Subject to any disclaimer, the term of this patent is extended or adjusted under 35 U.S.C. 154(b) by 200 days.

(21) Appl. No.: 16/005,457

(22) Filed: Jun. 11, 2018

(65) Prior Publication Data
US 2019/0375377 A1    Dec. 12, 2019

(51) Int. Cl.
*B60S 1/52* (2006.01)
*B60S 1/50* (2006.01)
*B60S 1/48* (2006.01)

(52) U.S. Cl.
CPC ............ *B60S 1/522* (2013.01); *B60S 1/482* (2013.01); *B60S 1/488* (2013.01); *B60S 1/50* (2013.01); *B60S 1/524* (2013.01); *B60S 1/487* (2013.01)

(58) Field of Classification Search
CPC ........ B60S 1/3415; B60S 1/522; B60S 1/524; B60S 1/48; B60S 1/487; B60S 1/488; B60S 1/3436; B60S 1/345; B60S 1/50; B60S 1/52
USPC .......... 15/250.04, 250.01, 250.351, 250.352; 239/284.1
See application file for complete search history.

(56) References Cited

U.S. PATENT DOCUMENTS

| | | | | |
|---|---|---|---|---|
| 2,910,715 A | * | 11/1959 | Ohrt ..................... | B60S 1/524 15/250.04 |
| 3,854,161 A | * | 12/1974 | Benson ................. | B60S 1/524 15/250.04 |
| 4,123,817 A | * | 11/1978 | Hartery ................. | B60S 1/48 15/250.04 |
| 4,192,038 A | * | 3/1980 | Klein .................... | B60S 1/524 15/250.04 |
| 5,016,312 A | * | 5/1991 | Frimley ................ | B60S 1/4087 15/250.04 |
| 5,327,614 A | * | 7/1994 | Egner-Walter ....... | B60S 1/3415 15/250.04 |

(Continued)

FOREIGN PATENT DOCUMENTS

| | | | |
|---|---|---|---|
| DE | 19913487 | * | 12/1999 |
| GB | 2290461 | * | 1/1996 |
| WO | WO2009014589 | | 1/2009 |

OTHER PUBLICATIONS

Machine translation of description portion of German publication 19913487, published Dec. 1999 (Year: 1999).*

*Primary Examiner* — Gary K. Graham (57) ABSTRACT

A windshield cleaning assembly for a vehicle includes a wiper that is operationally coupled to a wiper motor of a vehicle. A pipe is coupled to the wiper and extends from proximate to opposing ends of a blade of the wiper. The pipe has a first end that is closed. A pump is coupled to the vehicle is operationally coupled to an electrical circuit of the vehicle. A tank is coupled to the vehicle and is fluidically coupled to the pump. The tank is configured to position a fluid. A tube is fluidically coupled to and extends between the pump and a second end of the pipe. The pump is positioned to selectively pump the fluid from the tank through the tube and the pipe. The fluid exits the pipe under pressure through a plurality of holes to clean the windshield.

11 Claims, 6 Drawing Sheets

(56) References Cited

U.S. PATENT DOCUMENTS

| | | | |
|---|---|---|---|
| 5,784,751 A * | 7/1998 | Tippets | B60S 1/38 |
| | | | 15/250.04 |
| D396,840 S | 8/1998 | Vita | |
| 5,819,360 A * | 10/1998 | Fujii | B60S 1/482 |
| | | | 15/250.04 |
| 6,463,621 B1 * | 10/2002 | Zimmer | B60S 1/522 |
| | | | 15/250.04 |
| 6,561,209 B2 * | 5/2003 | Wojan | B60S 1/481 |
| | | | 137/79 |
| 6,892,417 B2 | 5/2005 | Franco | |
| 8,366,021 B2 * | 2/2013 | Trager | B60S 1/50 |
| | | | 239/284.1 |
| 8,505,832 B2 | 8/2013 | Shank | |
| 8,550,147 B2 | 10/2013 | Lansinger | |
| 2002/0144373 A1 * | 10/2002 | Muramatsu | B60S 1/3456 |
| | | | 15/250.352 |
| 2004/0226127 A1 | 11/2004 | Kaplan | |
| 2005/0086758 A1 | 4/2005 | Arkashevski | |
| 2012/0272471 A1 * | 11/2012 | Schmid | B60S 1/482 |
| | | | 15/250.04 |

* cited by examiner

WINDSHIELD CLEANING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to cleaning assemblies and more particularly pertains to a new cleaning assembly for a vehicle.

BRIEF SUMMARY OF THE INVENTION

An embodiment of the disclosure meets the needs presented above by generally comprising a wiper that is operationally coupled to a wiper motor of a vehicle. A pipe is coupled to the wiper and extends from proximate to opposing ends of a blade of the wiper. The pipe has a first end that is closed. A pump is coupled to the vehicle is operationally coupled to an electrical circuit of the vehicle. A tank is coupled to the vehicle and is fluidically coupled to the pump. The tank is configured to position a fluid. A tube is fluidically coupled to and extends between the pump and a second end of the pipe. The pump is positioned to selectively pump the fluid from the tank through the tube and the pipe. The fluid exits the pipe under pressure through a plurality of holes to clean the windshield.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 7 thereof, a new cleaning assembly embodying the principles and concepts of an embodiment of the disclosure and generally designated by the reference numeral 10 will be described.

Figure 1:
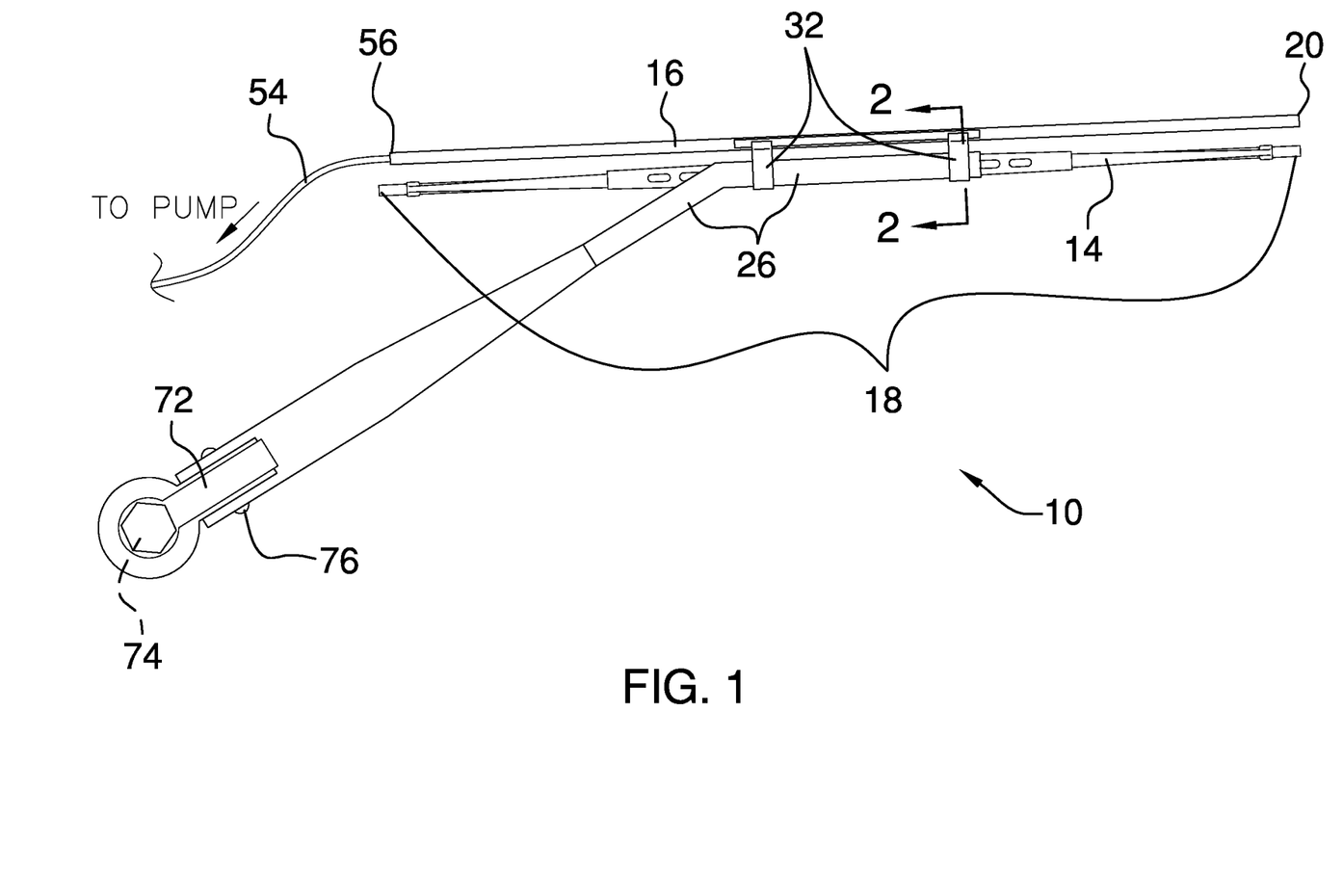
FIG. 1 is a top view of a windshield cleaning assembly according to an embodiment of the disclosure.

As best illustrated in FIGS. 1 through 7, the windshield cleaning assembly 10 generally comprises a wiper 12 that is operationally coupled to a wiper motor of a vehicle so that a blade 14 of the wiper 12 is configured to wipe a windshield of the vehicle. A pipe 16 is coupled to the wiper 12. The pipe 16 extends from proximate to opposing ends 18 of the blade 14, as shown in FIG. 1. The pipe 16 has a first end 20 that is closed.

Figure 2:
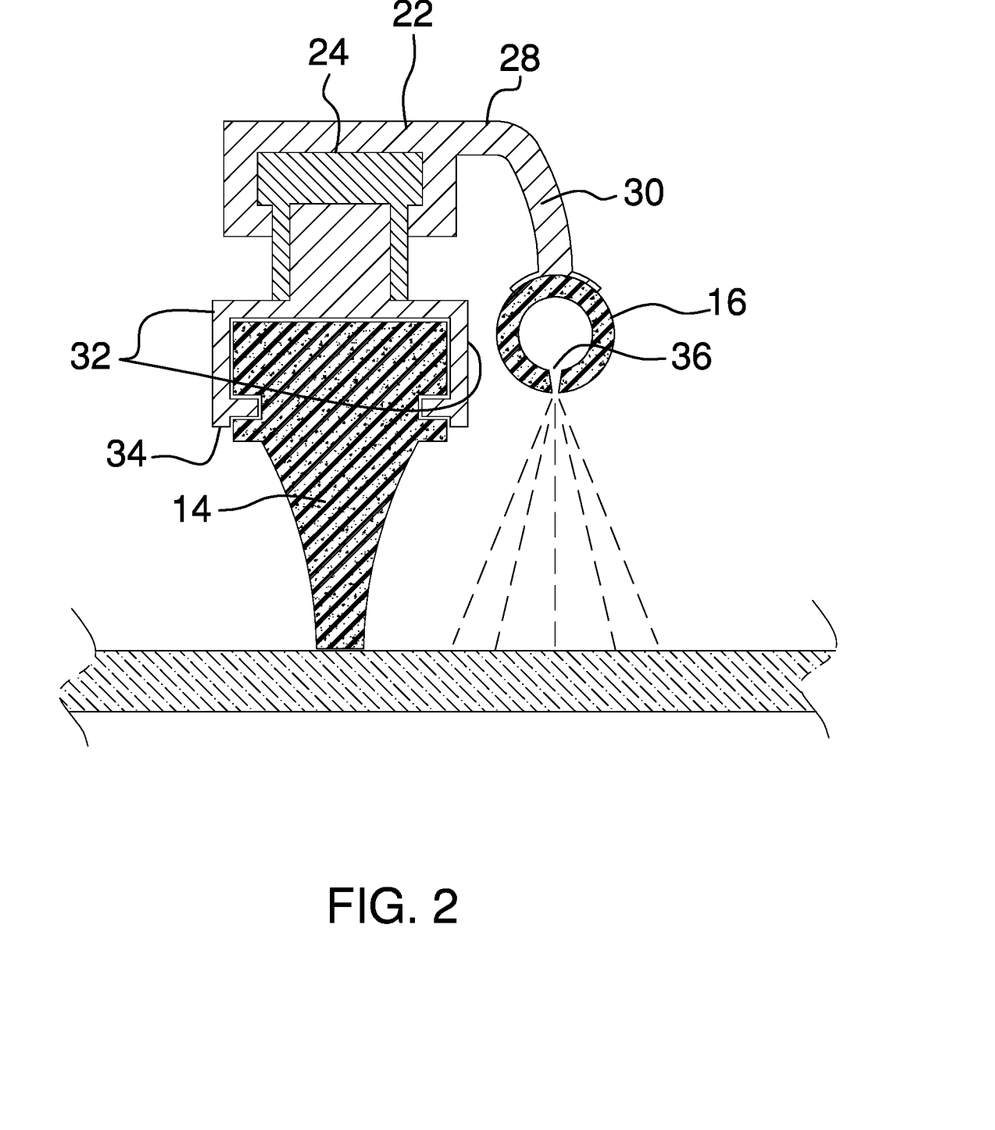
FIG. 2 is a cross-sectional view of an embodiment of the disclosure.

A plurality of brackets 22 is coupled to a top 24 of an arm 26 of the wiper 12, as shown in FIG. 2. The plurality of brackets 22 comprises two brackets 22. Each of a plurality of first bars 28 is coupled to and extends from a respective bracket 22 so that the first bar 28 is perpendicular to the arm 26. Each of a plurality of second bars 30 is coupled to and extends arcuately from a respective first bar 28 distal from an associated bracket 22. The pipe 16 is coupled to the plurality of second bars 30 distal from the plurality of first bars 28 so that the pipe 16 is positioned parallel to a respective opposing side 32 of the arm 26 proximate to a bottom 34 of the arm 26, as shown in FIG. 2.

Figure 3:
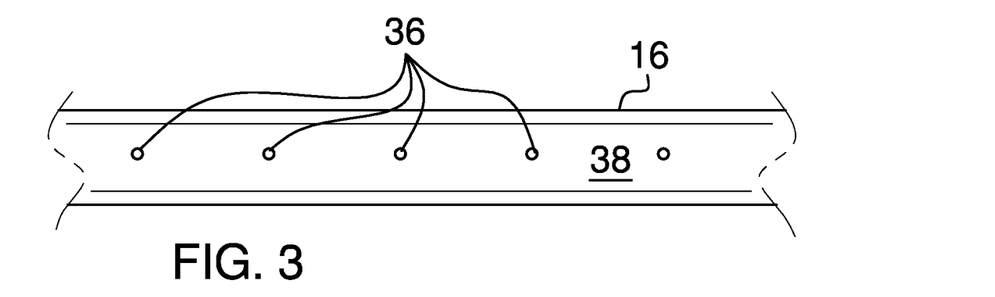
FIG. 3 is a bottom view of an embodiment of the disclosure.

A plurality of holes 36 is positioned in the pipe 16, as shown in FIG. 3. Each hole 36 is conically shaped so that the hole 36 is circumferentially smaller at an exterior surface 38 of the pipe 16. The hole 36 is configured to increase a velocity of a fluid exiting the pipe 16 through the hole 36.

Figure 5:
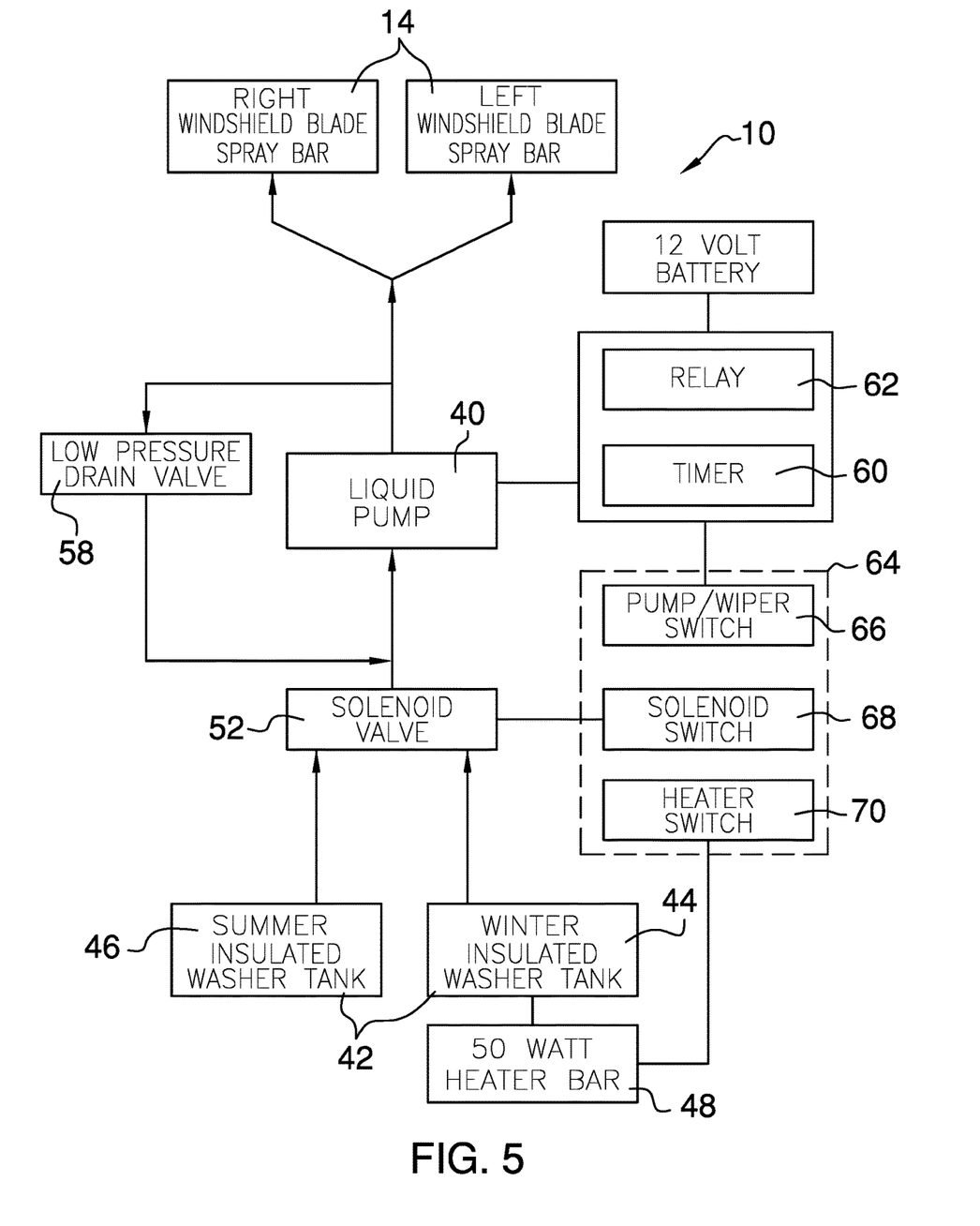
FIG. 5 is a block diagram of an embodiment of the disclosure.

A pump 40 and a tank 42 are coupled to the vehicle, as shown in FIG. 5. The pump 40 is operationally coupled to an electrical circuit of the vehicle. The tank 42 is configured to position a fluid, such as a windshield cleaning solution, a deicing solution, a degreasing solution, or the like. The tank 42 is coupled to the pump 40 so that the tank 42 is in fluidic communication with the pump 40.

The tank 42 comprises a first reservoir 44 and a second reservoir 46. The first reservoir 44 is configured to position a first solution. The first reservoir 44 is insulated so that the first reservoir 44 is configured maintain a temperature of the first solution. A heater 48 is coupled to the first reservoir 44. The heater 48 is operationally coupled to an electrical circuit of the vehicle. The heater 48 is configured to heat the first solution. The second reservoir 46 is configured to position a second solution. The second reservoir 46 is insulated so that the second reservoir 46 is configured to deter freezing of the second solution. The second reservoir 46 is fused to the first reservoir 44 so that the second reservoir 46 and the first reservoir 44 share a common wall 50.

A first valve 52 is coupled to the vehicle, as shown in FIG. 5. The first valve 52 is solenoid-actuated. The first valve 52 is operationally coupled the pump 40, the first reservoir 44, the second reservoir 46, and the electrical circuit of the vehicle. The first valve 52 is positioned to selectively couple the first reservoir 44 and the second reservoir 46 to the pump 40.

Figure 6:
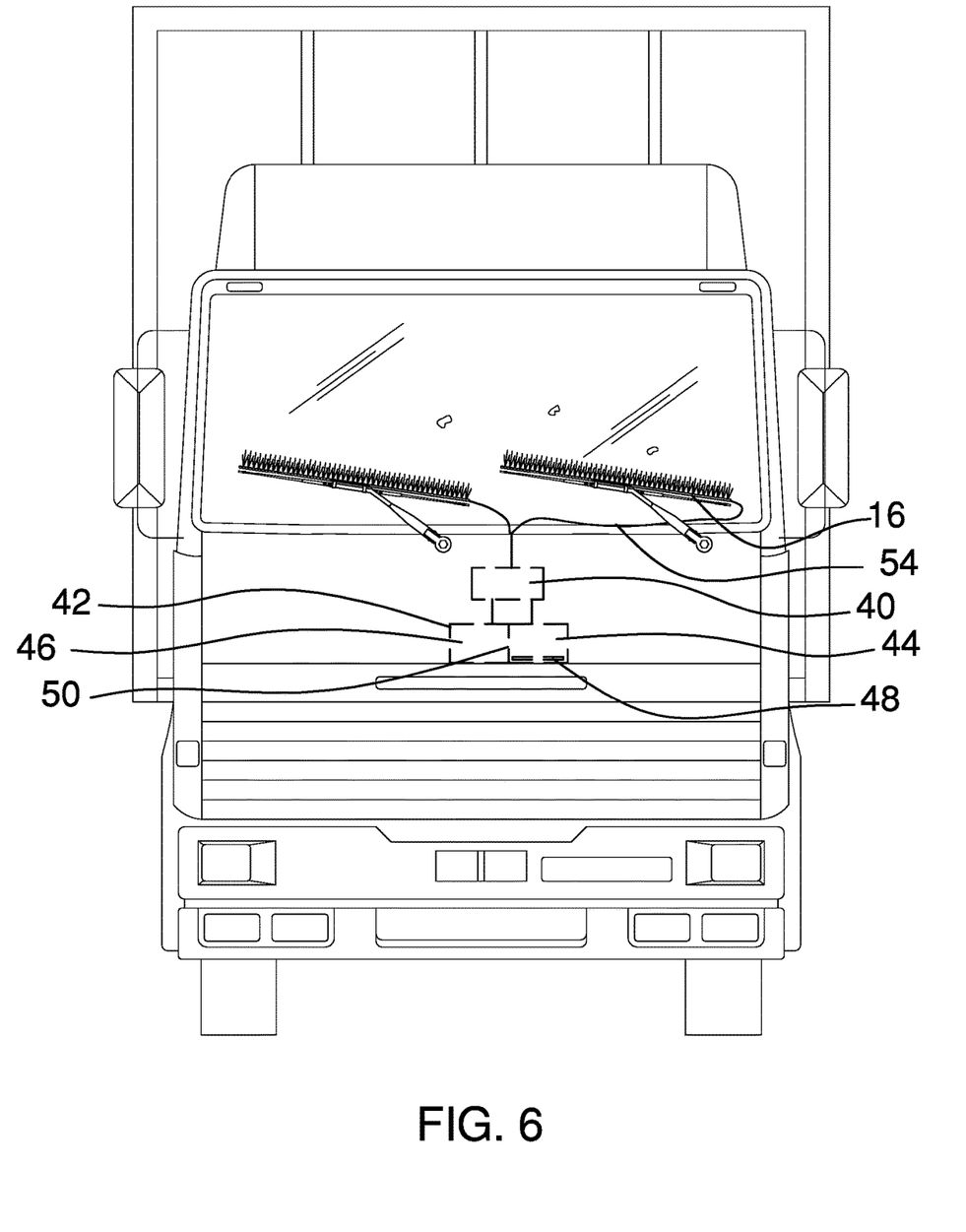
FIG. 6 is an in-use view of an embodiment of the disclosure.

A tube 54 is coupled to and extends between the pump 40 and a second end 56 of the pipe 16, as shown in FIG. 1, so that the tube 54 is in fluidic communication with the tank 42. The pump 40 is positioned to selectively pump the fluid from the tank 42 through the tube 54 and the pipe 16. The fluid exits the plurality of holes 36 under pressure to clean the windshield, as shown in FIG. 6.

A second valve 58 is coupled to the tube 54 and first valve 52, as shown in FIG. 5. The second valve 58 is in fluidic communication with the tube 54 and the first valve 52. The second valve 58 is low-pressure type. The second valve 58 is positioned to be actuated under low pressure to drain the fluid from the tube 54 to the tank 42 to prevent freezing of the fluid in the tube 54.

A timer 60 is operationally coupled to the pump 40, as shown in FIG. 5. A relay 62 is operationally coupled to the timer 60, the pump 40, and the electrical circuit of the vehicle. The timer 60 is positioned to actuate the relay 62 to couple the pump 40 to the electrical circuit of the vehicle for a set time. The set time corresponds to a number of wiping cycles and can be controlled to provide a specific number of wiping cycles.

A controller 64 is coupled to the vehicle so that the controller 64 is accessible to a driver of the vehicle. The controller 64 is operationally coupled to the pump 40, the heater 48, and the first valve 52, as shown in FIG. 5. The controller 64 is positioned to selectively actuate the pump 40 to pump the fluid from the tank 42 through the tube 54 and the pipe 16 so that the fluid exits the plurality of holes 36 under pressure to clean the windshield. The controller 64 also is positioned to selectively actuate the heater 48 to heat the first solution. The controller 64 also is positioned to selectively actuate the first valve 52 to selectively couple the pump 40 to the first reservoir 44 and the second reservoir 46.

The controller 64 comprises a first switch 66, a second switch 68, and a third switch 70, as shown in FIG. 5. The first switch 66 is operationally coupled to the timer 60 and the wiper motor of a vehicle. The first switch 66 is positioned to selectively actuate the timer 60 and the wiper motor. The second switch 68 is operationally coupled to the first valve 52. The second switch 68 is positioned to selectively actuate the first valve 52. The third switch 70 is operationally coupled to the to the heater 48. The third switch 70 is positioned to selectively actuate the heater 48.

A plate 72 is coupled to the arm 26 distal from the wiper 12, as shown in FIG. 1. The plate 72 is coupled to a wiper shaft 74 so that the plate 72 extends across a pivot 76 of the arm 26. The plate 72 is positioned to limit pivoting of the arm 26 distally from the windshield from a force of the fluid exiting the plurality of holes 36.

Figure 4:
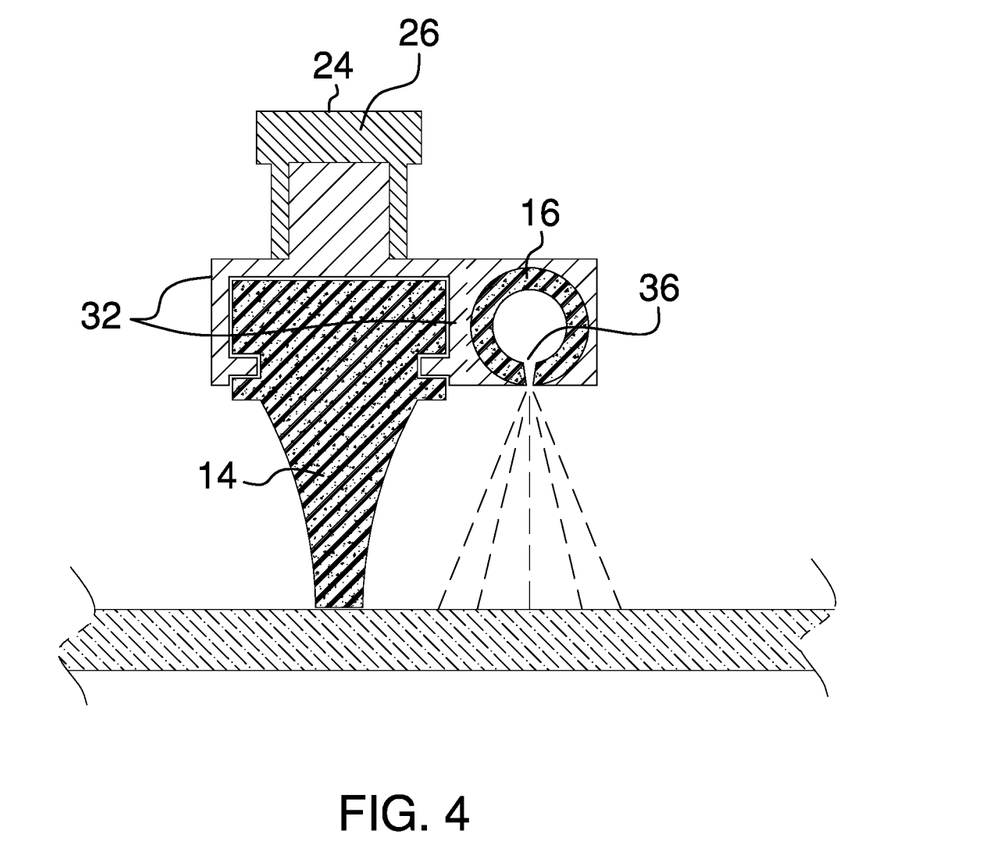
FIG. 4 is a cross-sectional view of an embodiment of the disclosure.
Figure 7:
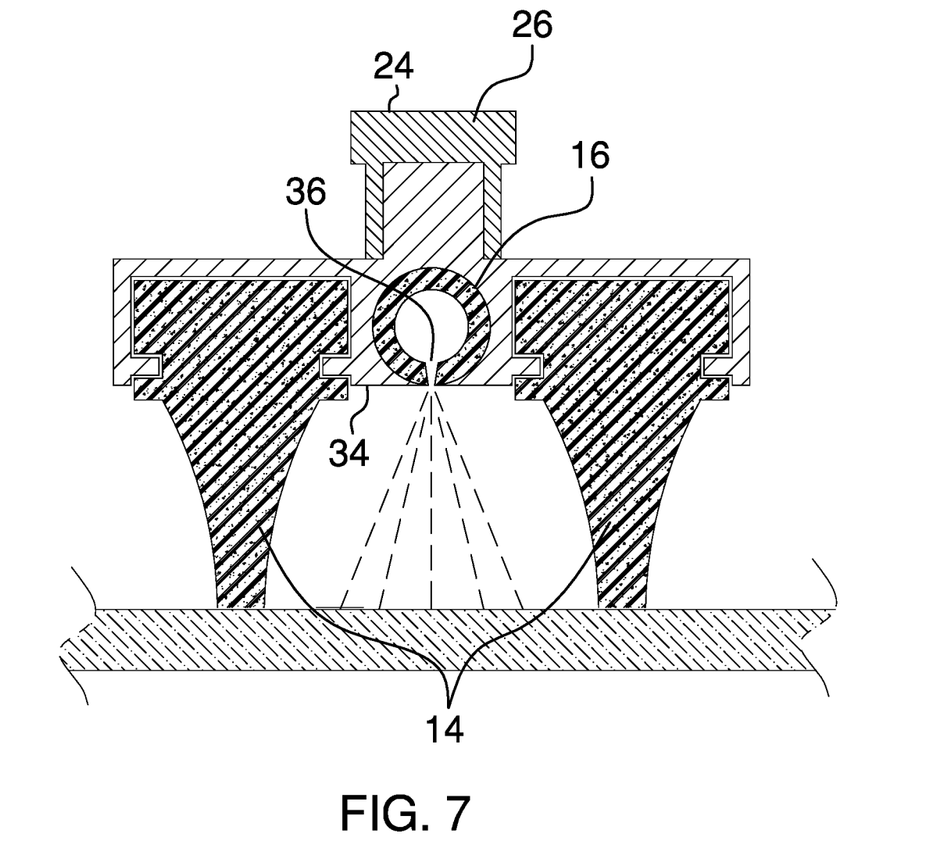
FIG. 7 is a cross-sectional view of an embodiment of the disclosure.

In another embodiment of the invention, as shown in FIG. 4, the pipe 16 is coupled to the respective opposing side 32 of the arm 26. In yet another embodiment of the invention, as shown in FIG. 7, the wiper 12 comprises a pair of blades 14 that is coupled to and extends from the bottom 34 of the wiper 12. The pipe 16 extends through the arm 26 proximate to the bottom 34 so that the fluid exits the plurality of holes 36 and passes between blades 14.

In use, the controller 64 selectively actuates the pump 40 to pump the fluid from the tank 42 through the tube 54 and the pipe 16 so that the fluid exits the plurality of holes 36 under pressure to clean the windshield. The controller 64 also selectively actuates the heater 48 to heat the first solution. The controller 64 also selectively actuates the first valve 52 to selectively couple the pump 40 to the first reservoir 44 and the second reservoir 46.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A windshield cleaning assembly comprising:
   a wiper operationally coupled to a wiper motor of a vehicle wherein a blade of said wiper is configured for wiping a windshield of the vehicle;
   a pipe coupled to said wiper such that said pipe extends from proximate to opposing ends of said blade, said pipe have a first end, said first end being closed;
   a plurality of holes positioned in said pipe;
   a pump coupled to the vehicle, said pump being operationally coupled to an electrical circuit of the vehicle;
   a tank coupled to the vehicle wherein said tank is configured for positioning a fluid, said tank being coupled to said pump said such that said tank is in fluidic communication with said pump;
   a tube coupled to and extending between said pump and a second end of said pipe such that said tube is in fluidic communication with said tank wherein said pump is positioned for selectively pumping the fluid from said tank through said tube and said pipe such that the fluid exits said plurality of holes under pressure for cleaning the windshield;
   a plurality of brackets coupled to a top of an arm of said wiper;

a plurality of first bars, each said first bar being coupled to and extending from a respective said bracket such that said first bar is perpendicular to said arm;
a plurality of second bars, each said second bar being coupled to and extending arcuately from a respective said first bar distal from an associated said bracket, said pipe being coupled to said plurality of second bars distal from said plurality of first bars by connection to an arcuate surface positioned in diametric opposition to each said holes, said arcuate surface extending in opposite directions from a respective second bar terminal end and extending around said pipe approximately a quarter of a circumference of said pipe, said pipe being coupled to said second bars such that said pipe is positioned parallel to a respective opposing side of said arm proximate to a bottom of said arm.

2. The assembly of claim 1, further including said plurality of brackets comprising two said brackets.

3. The assembly of claim 1, further including each said hole being conically shaped such that said hole is circumferentially smaller at an exterior surface of said pipe wherein said hole is configured for increasing a velocity of the fluid exiting said pipe through said hole.

4. The assembly of claim 1, further comprising:
said tank comprising:
a first reservoir configured for positioning a first solution, said first reservoir being insulated wherein said first reservoir is configured maintaining a temperature of the first solution,
a heater coupled to said first reservoir, said heater being operationally coupled to the electrical circuit of the vehicle wherein said heater is configured for heating the first solution, and
a second reservoir configured for positioning a second solution, said second reservoir being insulated wherein said second reservoir is configured for deterring freezing of the second solution; and
a first valve coupled to the vehicle, said first valve being solenoid-actuated, said first valve being operationally coupled said pump, said first reservoir, said second reservoir, and the electrical circuit of the vehicle wherein said first valve is positioned for selectively coupling said first reservoir and said second reservoir to said pump.

5. The assembly of claim 4, further including said second reservoir being fused to said first reservoir such that said second reservoir and said first reservoir share a common wall.

6. The assembly of claim 4, further including a second valve coupled to said tube and first valve such that said second valve is in fluidic communication with said tube and said first valve, said second valve being low-pressure wherein said second valve is positioned for actuating under low pressure for draining the fluid from said tube to said tank for preventing freezing of the fluid in said tube.

7. The assembly of claim 4, further including a controller coupled to the vehicle such that said controller is accessible to a driver of the vehicle, said controller being operationally coupled to said pump, said heater, and said first valve wherein said controller is positioned for selectively actuating said pump for pumping the fluid from said tank through said tube and said pipe such that the fluid exits said plurality of holes under pressure for cleaning the windshield, actuating said heater for heating the first solution, and actuating said actuator for selectively coupling said pump to said first reservoir and said second reservoir.

8. The assembly of claim 7, further comprising:
a timer operationally coupled to said pump;
a relay operationally coupled to said timer, said pump, and the electrical circuit of the vehicle wherein said timer is positioned for actuating said relay for coupling said pump to the electrical circuit of the vehicle for a set time.

9. The assembly of claim 8, further including said controller comprising:
a first switch operationally coupled to said timer and the wiper motor of a vehicle wherein said first switch is positioned for selectively actuating said timer and the wiper motor;
a second switch operationally coupled to said first valve wherein said second switch is positioned for selectively actuating said first valve; and
a third switch operationally coupled to said to said heater wherein said third switch is positioned for selectively actuating said heater.

10. The assembly of claim 2, further including a plate coupled to said arm distal from said wiper, said plate being coupled to a wiper shaft such that said plate extends across a pivot of said arm wherein said plate is positioned for limiting pivoting of said arm distally from the windshield from a force of the fluid exiting said plurality of holes.

11. A windshield cleaning assembly comprising:
a wiper operationally coupled to a wiper motor of a vehicle wherein a blade of said wiper is configured for wiping a windshield of the vehicle;
a pipe coupled to said wiper such that said pipe extends from proximate to opposing ends of said blade, said pipe have a first end, said first end being closed;
a plurality of brackets coupled to a top of an arm of said wiper, said plurality of brackets comprising two said brackets;
a plurality of first bars, each said first bar being coupled to and extending from a respective said bracket such that said first bar is perpendicular to said arm;
a plurality of second bars, each said second bar being coupled to and extending arcuately from a respective said first bar distal from an associated said bracket, said pipe being coupled to said plurality of second bars distal from said plurality of first bars by connection to an arcuate surface, each said arcuate surface extending in opposite directions from a respective second bar terminal end and extending around said pipe approximately a quarter of a circumference of said pipe, said pipe being coupled to said second bars such that said pipe is positioned parallel to a respective opposing side of said arm proximate to a bottom of said arm;
a plurality of holes positioned in said pipe, said arcuate surface being positioned in diametric opposition to said holes, each said hole being conically shaped such that said hole is circumferentially smaller at an exterior surface of said pipe wherein said hole is configured for increasing a velocity of a fluid exiting said pipe through said hole;
a pump coupled to the vehicle, said pump being operationally coupled to an electrical circuit of the vehicle;
a tank coupled to the vehicle wherein said tank is configured for positioning a fluid, said tank being coupled to said pump said such that said tank is in fluidic communication with said pump, said tank comprising:
a first reservoir configured for positioning a first solution, said first reservoir being insulated wherein said first reservoir is configured maintaining a temperature of the first solution, a heater coupled to said first reservoir, said heater being operationally coupled to an electrical circuit of the vehicle wherein said heater is configured for heating the first solution, and a second reservoir configured for positioning a second solution, said second reservoir being insulated wherein said second reservoir is configured for deterring freezing of the second solution, said second reservoir being fused to said first reservoir such that said second reservoir and said first reservoir share a common wall;

a first valve coupled to the vehicle, said first valve being solenoid-actuated, said first valve being operationally coupled said pump, said first reservoir, said second reservoir, and the electrical circuit of the vehicle wherein said first valve is positioned for selectively coupling said first reservoir and said second reservoir to said pump;

a tube coupled to and extending between said pump and a second end of said pipe such that said tube is in fluidic communication with said tank wherein said pump is positioned for selectively pumping the fluid from said tank through said tube and said pipe such that the fluid exits said plurality of holes under pressure for cleaning the windshield;

a second valve coupled to said tube and first valve such that said second valve is in fluidic communication with said tube and said first valve, said second valve being low-pressure wherein said second valve is positioned for actuating under low pressure for draining the fluid from said tube to said tank for preventing freezing of the fluid in said tube;

a timer operationally coupled to said pump;

a relay operationally coupled to said timer, said pump, and the electrical circuit of the vehicle wherein said timer is positioned for actuating said relay for coupling said pump to the electrical circuit of the vehicle for a set time;

a controller coupled to the vehicle such that said controller is accessible to a driver of the vehicle, said controller being operationally coupled to said pump, said heater, and said first valve wherein said controller is positioned for selectively actuating said pump for pumping the fluid from said tank through said tube and said pipe such that the fluid exits said plurality of holes under pressure for cleaning the windshield, actuating said heater for heating the first solution, and actuating said actuator for selectively coupling said pump to said first reservoir and said second reservoir, said controller comprising:

a first switch operationally coupled to said timer and the wiper motor of a vehicle wherein said first switch is positioned for selectively actuating said timer and the wiper motor, a second switch operationally coupled to said first valve wherein said second switch is positioned for selectively actuating said first valve, and a third switch operationally coupled to said to said heater wherein said third switch is positioned for selectively actuating said heater; and a plate coupled to said arm distal from said wiper, said plate being coupled to a wiper shaft such that said plate extends across a pivot of said arm wherein said plate is positioned for limiting pivoting of said arm distally from the windshield from a force of the fluid exiting said plurality of holes.

* * * * *